United States Patent [19]
Dinkins

[11] Patent Number: 6,042,128
[45] Date of Patent: Mar. 28, 2000

[54] COLLAPSIBLE SHOPPING CART

[76] Inventor: Wylene Dinkins, 2300 Country Walk, #717, Snellville, Ga. 30037

[21] Appl. No.: 08/909,153

[22] Filed: Aug. 11, 1997

Related U.S. Application Data

[63] Continuation-in-part of application No. 08/554,252, Nov. 6, 1995, abandoned.

[51] Int. Cl.⁷ ........................................... B62B 1/00
[52] U.S. Cl. .......................... 280/47.18; 280/42; 280/40; 280/644; 280/652
[58] Field of Search .................................. 280/42, 47.18, 280/47.24, 47.26, 40, 644, 645, 646, 649, 652, 659, DIG. 3, DIG. 4

[56] References Cited

U.S. PATENT DOCUMENTS

| | | | |
|---|---|---|---|
| 1,941,902 | 1/1934 | Lewis | 5/98.3 |
| 2,421,751 | 6/1947 | Giordano | 280/41 |
| 3,722,905 | 3/1973 | Solomon | 280/39 |
| 3,931,985 | 1/1976 | Knebel | 280/42 |
| 3,945,660 | 3/1976 | Zalewski | 280/42 |
| 4,266,791 | 5/1981 | Myers | 280/37 |
| 5,125,674 | 6/1992 | Manuszak | 280/30 |
| 5,785,334 | 7/1998 | Robinson | 280/204 |

*Primary Examiner*—J. J. Swann
*Assistant Examiner*—James S. McClellan

[57] ABSTRACT

The collapsible shopping cart has a main basket made of a web material for placing shopping items. Additional volume is provided by adding nesting tubs to the upper perimeter of the cart. The collapsible shopping cart is rolled on four wheel one set of which permit the cart to be steered. The cart is collapsible to a small volume for storage or transportation in a users vehicle.

3 Claims, 2 Drawing Sheets

COLLAPSIBLE SHOPPING CART

CROSS REFERENCE TO RELATED APPLICATIONS

This application is a continuation-in-part of the application Ser. No. 08/554,252 filed on Nov. 6, 1995 now abandoned, titled Collapsible Shopping Cart.

BACKGROUND OF THE INVENTION

1. Field of the Invention

The present invention relates to a collapsible shopping cart which has removable baskets and bags to hold shopping items. The baskets and bags are removed at the checkout counter, the items removed, processed and returned. Then the baskets and bags are returned to the cart for movement to transportation. The invention reduces or eliminates the need for the typical bags provided by stores and solves the problem of containing shopping items at wholesale stores that do not provide bags. The cart collapses when not in use for storage.

2. Description of the Prior Art

Portable shopping carts have been utilized for decades. However, until now a versatile portable shopping carts able to be collapsible but none are capable of being converted from a four wheeled cart to a two wheeled cart.

Numerous innovations for a collapsible shopping cart have been provided in the prior art that are described as follows. Even though these innovations may be suitable for the specific individual purposes to which they address, they differ from the present invention as hereinafter contrasted.

In U.S. Pat. No. 4,669,743, Collapsible Wheeled Material Carrier, invented by Jime Tipke comprises a Collapsible Wheeled Material Carrier which folds to a storage position when not in use. The carrier has a frame with transversely folding braces and a folding bottom. It also has a folding extendable handle assembly. The carrier can be hand propelled or moved by a vehicle.

The present invention differs from the above described patented invention for the following reasons: the present invention does not have ridged sides and bottom, the frame of the present invention is designed to hold unique tubs for holding shopping items and finally the present invention has castors for steering.

In U.S. Pat. No. 5,028,060, Utility Cart, invented by David Martin comprises a cart having a load receiving box supported by a rectangular frame inset within the box lower perimeter. End members of the frame swingably carry front and rear axil frames while side members of the frame swingably carry struts which engage the ail ends to retain same in a deployed position. The axil frame and struts are upwardly repositionable adjacent the box ends and sides, subsequent to wheel removal, to collapse the cart for storage or for carrying in a vehicle. A U-shaped handle has lower ends detachable mounted to a box end wall by a pair of sleeve structures.

The present invention differs from the above described patented invention for the following reasons: the present invention is collapsible with out removing the wheels or the handle. The present invention further has a upper section with tubs for small items and a lower area for large bulk items.

In U.S. Pat. No. 3,837,667, Lugs and Cart Therefor, invented by Morton A. Sernovitz comprises a combination of an open frame cart and a plurality of containers or lugs, as they are called in this art, is disclosed which fit together in a number of convenient carrying arrangements. The containers have transverse spaced grooves in there bottom surfaces which fit upon and coincide with pairs of longitudinal and transverse frame members of the cart to hold the containers thereon during produce handling procedures. The cart has two tiers in the frame such that each tier can hold one container longitudinally or two transversely. The containers also nest in a stacked relationship within each other and the longitudinal distance between the bottom grooves of the containers is the same as the transverse distance between their top longitudinal rolled flange edges so that one container will rest on the other in a stable relationship.

The present invention differs from the above described patented invention for the following reasons: the present invention collapses and is made from light weight materials so it is easily transportable.

In U.S. Pat. No. 2,544,220, Shopping Carrier for Stores, invented by George W. Concklin comprises a cart with two shelves for holding items typically in self-service stores. Additionally it folds for storage. Further it is designed to nest with other carts to minimize on floor storage.

The present invention differs from the above described patented invention for the following reasons; the present invention has a web tub for carrying bulk items and containing irregularly shaped items, the tubs in the present invention interlock with the frame with out additional locking parts or special parts.

Numerous innovations for collapsible shopping cart have been provided in the prior art that are adapted to be used. Even though these innovations may be suitable for the specific individual purposes to which they address, they would not be suitable for the purposes of the present invention as heretofore described.

SUMMARY OF THE INVENTION

The present invention allows a user to grocery shop or "mall" shop with their own personal collapsible cart. The user can unfold the cart at the grocery store or mall and is then ready to load items therein. If a user is shopping with a very long list of items, he has the option of inserting two upper baskets which are custom designed to fit within the cart frames. The two baskets will snugly fit therein. If only one basket is required, or access to the main container is required, one of the baskets is designed to accommodate a small infant, by flipping up a hinged cover that reveals leg openings at the bottom end of the basket. After shopping is complete, the groceries are removed as usual at checkout, and then reinserted into the cart. The cart is then utilized for the return trip home. The bottom container is equipped with at least two heavy duty removable bags which are preferably canvas. Therefore, a need for large grocery bags would be virtually eliminated. If the cart is full, remove the two top baskets and place them in a user's car, then remove the two bottom canvas bags. The cart is now ready to fold and return to your car.

If the user lives in an apartment complex where the car is a good distance from his unit, the process is simply reversed by rolling the groceries to the user's door or elevator. In addition, the cart can be utilized in large shopping malls or stores without shopping carts for people with large shopping lists such as at Christmas time.

The two wheeled version allows single or older shoppers with much smaller requirements to shop with the same advantages. In addition, older shoppers living within a few blocks of the grocery store could easily walk thereto utilizing the cart and return with their shopping items therein.

The invention relates to an improved shopping cart that is useful to contain shopping items chosen by customers in self service stores.

The carts of this type are preferably constructed of light weight materials so they can be easily moved and stored. One object of the invention is to provide a light weight design that becomes increasingly more ridged as it is loaded.

The inventions encountered in the prior art do not meet the need of a consumer shopping in a self serve store in that the prior inventions do not have a bottom container made form a light weight web to hold bulk items and have tubs to hold small items. Further, the current invention folds for storage or transport in a consumers vehicle to the self service store.

Accordingly, it is an object of the present invention to provide a folding cart with provisions to hold shopping items.

More particularly, it is an object of the present invention to provide a web container to hold large bulky shopping items.

Another feature of the present invention are tubs that are designed to hold small items and be placed on the checkout counter of a self service store.

Yet another feature of the present invention is that the tubs may be stacked in such a way that the upper tub is held by the rim of the lower tub so that the upper tub does not press upon the items in the lower tub.

Still another feature of the present invention is that it is designed so that, when the cart is in the open position, as more items are placed in the cart the critical structural members of the webbing are placed under tension making the cart more ridged.

Another feature of the present invention is that it has wheels so that it may be pushed by the user.

Still another feature of the present invention is that it has one pair of wheels that swivel to provide directional control.

When the tub is designed in accordance with the present invention, the transverse grooves on the bottom of the tubs securely lock into the frame.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

EMBODIMENT

110—collapsible shopping cart (110)
112—frame (112)
112A—frame left bottom longitudinal member (112A)
112AA—frame left bottom longitudinal member adapter (112AA)
12AB—frame left bottom longitudinal member left slide assembly (112AB)
112B—frame right bottom longitudinal member (112B)
112BB—frame right bottom longitudinal member right slide assembly (112BB)
112C—frame cross brace assembly (112C)
112CA—frame cross brace assembly right cross brace (112CA)
112CAA—frame cross brace assembly left upper fastener (112CAA)
112CB—frame cross brace assembly left cross brace (112CB)
112CBA—frame cross brace assembly pivot fastener (112CBA)
112CD—frame cross brace assembly front cross brace pivot (112CD)
112E—frame left upper longitudinal member (112E)
112F—frame right upper longitudinal member (112F)
113—web basket (113)
113A—web basket right diagonal (113A)
113B—web basket left diagonal (113B)
113CA—web basket front upper cross brace (113CA)
113CB—web basket front lower cross brace (113CB)
113DA—web basket rear upper cross brace (113DA)
113DB—web basket rear lower cross brace (113DB)
114—handle (114)
114A—handle left riser bar (114A)
14AA—handle left riser bar lower fastener (not shown)
114B—handle right riser bar (114B)
114BA—handle left riser bar lower fastener (not shown)
114C—handle push bar (114C)
114CA—handle push bar left riser bar joint (114CA)
114CB—handle push bar right riser bar universal joint (114CB)
116—mainwheel (116)
116AA—main wheel left tire (116AA)
116AAA—main wheel left axil (116AAA)
116AAB—main wheel left hub (116AAB)
116AAC—main wheel left axil retainer fastener (116AAC)
116AAD—main wheel left axil retainer (116AAD)
116AB—main wheel right tire (not shown)
116ABA—main wheel right axil (not shown)
116ABB—main wheel right hub (not shown)
116ABC—main wheel right axil retainer fastener (not shown)
116ABD—main wheel right ail retainer (not shown)
120—tub (120)

BRIEF DESCRIPTION OF THE PREFERRED EMBODIMENT

DETAILED DESCRIPTION OF THE PREFERRED EMBODIMENT

Figure 1:
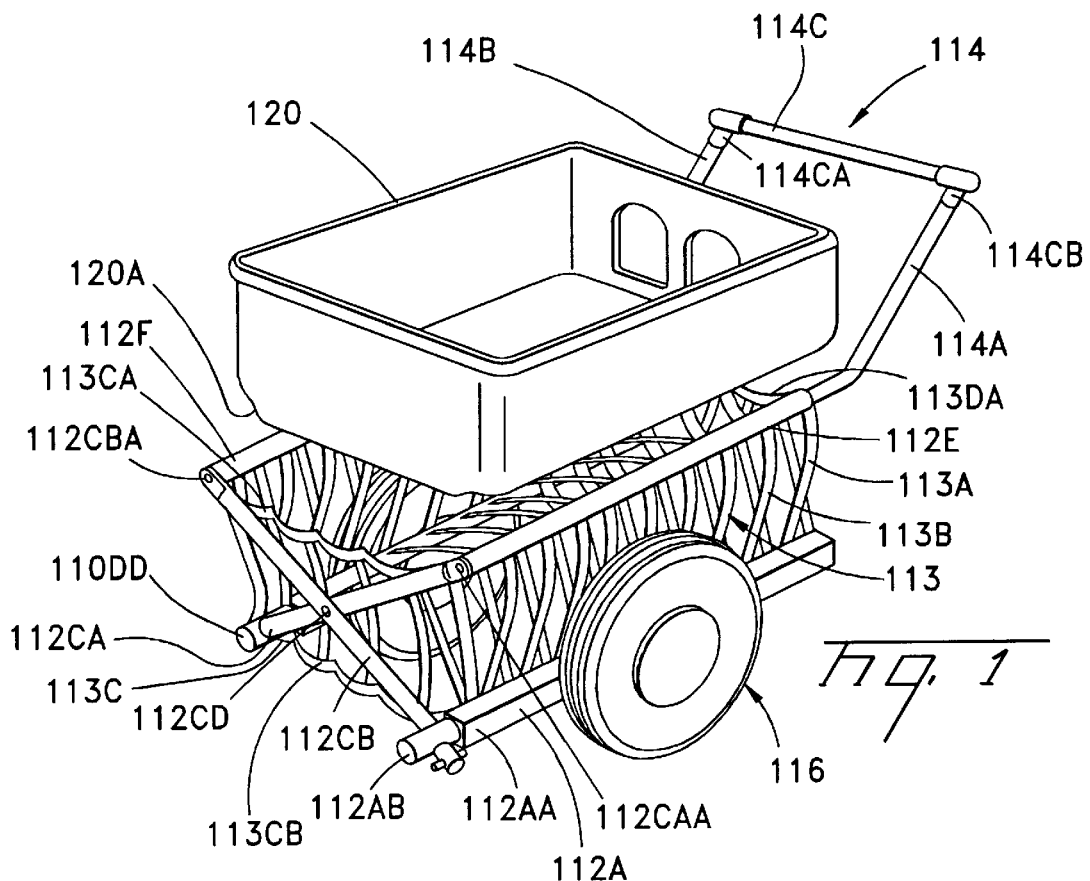
FIG. 1 is a perspective left side view of the two wheeled shopping cart having a tub positioned thereon.
Figure 2:
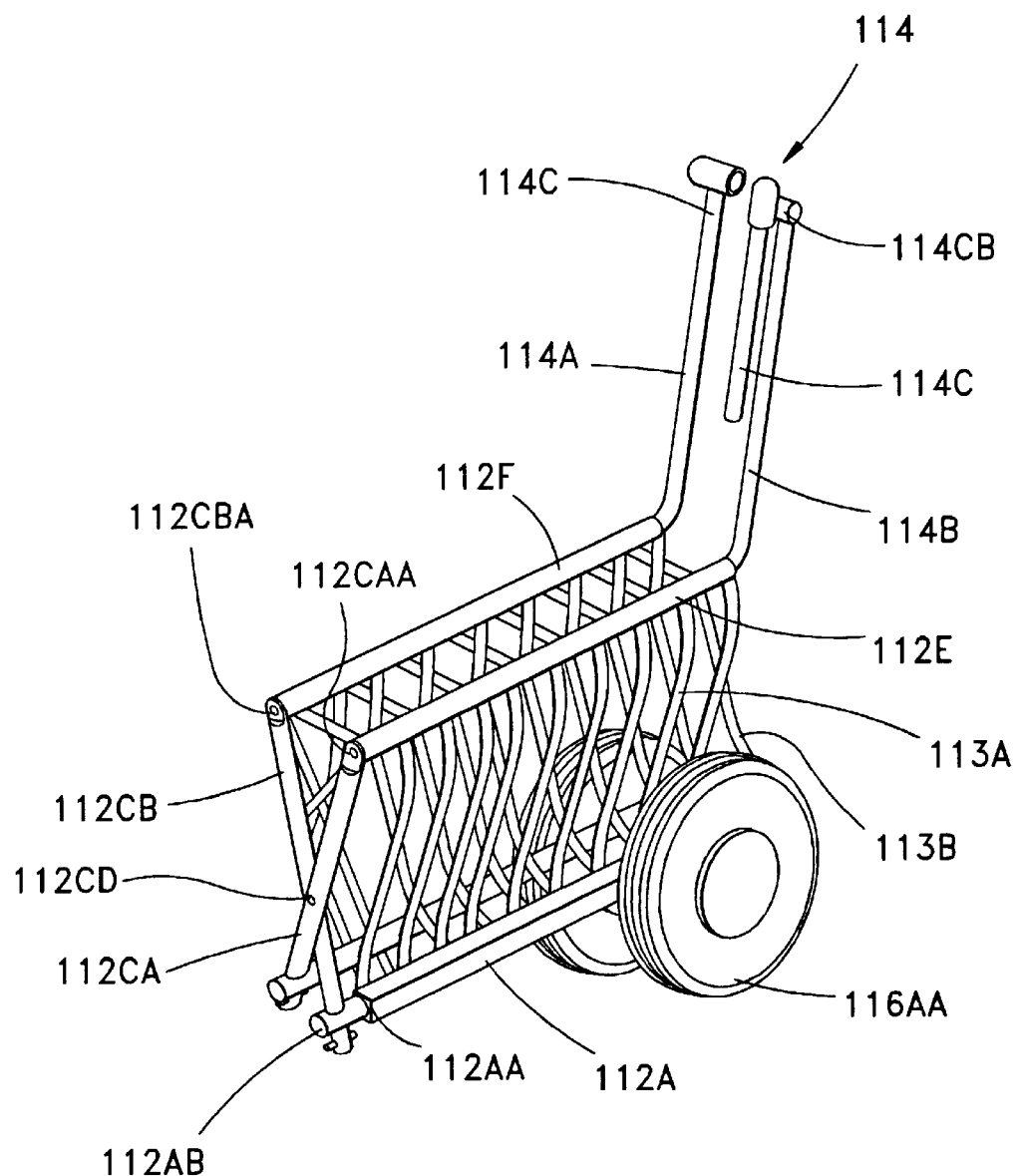
FIG. 2 is a perspective view from the left front side of a two wheeled shopping cart in a fully collapsed position.

Firstly, referring to FIG. 1 and FIG. 2 which are a perspective left front view of a collapsible shopping cart (110) in an opened position having a tub (120) being positioned thereon, and a perspective view from the left front side of a two wheeled shopping cart in a fully collapsed position, respectively. The collapsible shopping cart (110) comprises a frame (112) which comprises a frame left bottom longitudinal member (112A) having a frame left bottom longitudinal member adapter (112AA) positioned at a front distal end thereof The frame left bottom longitudinal member (112A) further comprises a frame left bottom longitudinal member left slide assembly (112AB) rotatably mounted within the frame left bottom longitudinal member (112A) and the frame left bottom longitudinal member adapter (112AA), the frame (112) further comprises a frame right bottom longitudinal member (112B) having a frame right bottom longitudinal member right slide assembly (112BB) rotatably mounted therein and extending from a front distal end thereof The collapsible shopping cart (110) further comprises a frame cross brace assembly (112C) which comprises a frame cross brace assembly right cross brace (112CA) securely attached at a bottom distal end to the frame right bottom longitudinal member right slide assembly (112BB). The frame cross brace assembly (112C) further comprises a frame cross brace assembly left cross brace (112CB) securely attached at a bottom distal end to the frame left bottom longitudinal member left slide assembly (112AB). A frame cross brace assembly front cross brace pivot (112CD) movably connects the frame cross brace assembly right cross brace (112CA) to the frame cross brace assembly left cross brace (112CB) in a mid section thereof The collapsible shopping cart (110) further comprises a front distal end of a frame left upper longitudinal member (112E) pivotally connected to a top distal end of the frame cross brace assembly right cross brace (112CA) by a frame cross brace assembly left upper fastener (112CAA).

The collapsible shopping cart (110) further comprises a front distal end of a frame right upper longitudinal member (112F) pivotally connected to a top distal end of the frame cross brace assembly left cross brace (112CB) by a frame cross brace assembly pivot fastener (112CBA).

The collapsible shopping cart (110) further comprises a web basket (113) which comprises a first set of plurality of web basket right diagonals (113A) securely attached at a top distal end to the frame left upper longitudinal member (112E) and securely attached at a bottom distal end to the frame left bottom longitudinal member (112A). A second set of plurality of web basket right diagonals (113A) are securely attached at a top distal end to the frame right upper longitudinal member (112F) and securely attached at a bottom distal end to the frame right bottom longitudinal member (112B). A third set of plurality of web basket right diagonals (113A) are securely attached at a top distal end to a web basket front upper cross brace (113CA) which is securely attached on a left distal end to the front distal end of the frame left upper longitudinal member (112E) and further securely attached on a right distal end to the front distal end of the frame right upper longitudinal member (112F). The third set of plurality of web basket right diagonals (113A) are securely attached at a bottom distal end to a web basket front lower cross brace (113CB) which is securely attached at a left distal end to the front distal end of the frame left bottom longitudinal member (112A) and further securely attached at a right distal end to the front distal end of the frame right bottom longitudinal member (112B). A fourth set of plurality of web basket right diagonals (113A) are securely attached at a top distal end to a web basket rear upper cross brace (113DA) which is securely attached on a left distal end to the rear distal end of the frame left upper longitudinal member (112E) and further securely attached on a right distal end to the rear distal end of the frame right upper longitudinal member (112F). The fourth set of plurality of web basket right diagonals (113A) are securely attached at a bottom distal end to a web basket rear lower cross brace (113DB) which is securely attached at a left distal end to the rear distal end of the frame left bottom longitudinal member (112A) and further securely attached at a right distal end to the rear distal end of the frame right bottom longitudinal member (112B). The web basket (113) further comprises a first set of plurality of web basket left diagonals (113B) which are securely attached at a top distal end to the frame left upper longitudinal member (112E) and securely attached at a bottom distal end to the frame left bottom longitudinal member (112A). A second set of plurality of web basket left diagonals (113B) are securely attached at a top distal end to the frame right upper longitudinal member (112F) and securely attached at a bottom distal end to the frame right bottom longitudinal member (112B). A third set of plurality of web basket left diagonals (113B) are securely attached at a top distal end to the web basket front upper cross brace (113CA). The third set of plurality of web basket left diagonals (113B) are securely attached at a bottom distal end to the web basket front lower cross brace (113CB). A fourth set of plurality of web basket left diagonals (113B) are securely attached at a top distal end to a web basket rear upper cross brace (113DA), the fourth set of plurality of web basket left diagonals (113B) are securely attached at a bottom distal end to a web basket rear lower cross brace (113DB).

The collapsible shopping cart (110) further comprises a handle (114) which comprises a handle left riser bar (114A) securely attached at a bottom distal end to the rear distal end of the frame left upper longitudinal member (112E) by a handle left riser bar lower fastener (not shown). The handle left riser bar (114A) is pivotally connected at a top distal end to left distal end of a handle push bar (114C) by a handle push bar right riser bar universal joint (114CB). The handle (114) further comprises a handle right riser bar (114B) securely attached at a bottom distal end to the rear distal end of the frame right upper longitudinal member (112F) by a handle left riser bar lower fastener (not shown). The handle right riser bar (114B) is removably attached at a top distal end to a right distal end of the handle push bar (114C) by a handle push bar left riser bar joint (114CA).

The collapsible shopping cart (110) is manufactured from a material selected from a group consisting of plastic, plastic composite, epoxy, fiberglass, carbon-graphite, wood, wood composite, metal, and metal alloy.

Figure 3:
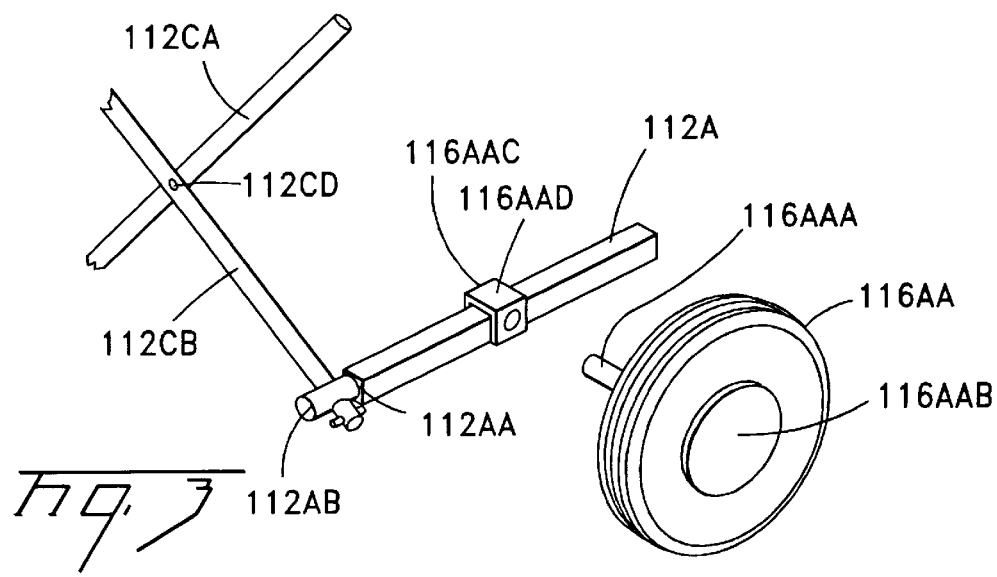
FIG. 3 is a perspective view of a main wheel left tire mounting onto a main wheel left axil retainer attached to a frame left bottom longitudinal member.

Lastly, referring to FIG. 3 is a perspective view of a main wheel left tire (116AA) mounting onto a main wheel left ail retainer (116AAD) attached to a frame left bottom longitudinal member (112A). At least two main wheels (116) comprise a main wheel left tire (116AA) mounted on a main wheel left hub (116AAB) which is securely connected to an outer distal end of a main wheel left axil (116AAA) which is rotatably connected at an inner distal end to a main wheel left axil retainer (16AAD) securely mounted on the frame left bottom longitudinal member (112A) by at least one main wheel left axil retainer fastener (116AAC). A main wheel right tire (not shown) is mounted on a main wheel right hub (not shown) which is securely connected to an outer distal end of a main wheel right ail (not shown which is rotatably connected at an inner distal end to a main wheel right axil retainer (not shown) securely mounted on the frame right bottom longitudinal member (112B) by at least one main wheel right axil retainer fastener (not shown).

It will be understood that each of the elements described above, or two or more together, may also find a useful application in other types of constructions differing from the type described above.

While the invention has been illustrated and described as embodied in a collapsible shopping cart, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A collapsible shopping cart (110) comprising:

A) a frame (112) which comprises a frame left bottom longitudinal member (112A) having a frame left bottom longitudinal member adapter (112AA) positioned at a front distal end thereof, the frame left bottom longitudinal member (112A) further comprises a frame left bottom longitudinal member left slide assembly (112AB) rotatably mounted within the frame left bottom longitudinal member (112A) and the frame left bottom longitudinal member adapter (112AA), the frame (112) further comprises a frame right bottom longitudinal member (112B) having a frame right bottom longitudinal member right slide assembly (112BB) rotatably mounted therein and extending from a front distal end thereof;

B) a frame cross brace assembly (112C) which comprises a frame cross brace assembly right cross brace (112CA) securely attached at a bottom distal end to the frame right bottom longitudinal member right slide assembly (112BB), the frame cross brace assembly (112C) further comprises a frame cross brace assembly left cross brace (112CB) securely attached at a bottom distal end to the frame left bottom longitudinal member left slide assembly (112AB), a frame cross brace assembly front cross brace pivot (112CD) movably connects the frame cross brace assembly right cross brace (112CA) to the frame cross brace assembly left cross brace (112CB) in a mid section thereof;

C) a front distal end of a frame left upper longitudinal member (112E) is pivotally connected to a top distal end of the frame cross brace assembly right cross brace (112CA) by a frame cross brace assembly left upper fastener (112CAA);

D) a front distal end of a frame right upper longitudinal member (112F) is pivotally connected to a top distal end of the frame cross brace assembly left cross brace (112CB) by a frame cross brace assembly pivot fastener (112CBA);

E) a web basket (113) which comprises a first set of plurality of web basket right diagonals (113A) are securely attached at a top distal end to the frame left upper longitudinal member (112E) and securely attached at a bottom distal end to the frame left bottom longitudinal member (112A), a second set of plurality of web basket right diagonals (113A) are securely attached at a top distal end to the frame right upper longitudinal member (112F) and securely attached at a bottom distal end to the frame right bottom longitudinal member (112B), a third set of plurality of web basket right diagonals (113A) are securely attached at a top distal end to a web basket front upper cross brace (113CA) which is securely attached on a left distal end to the front distal end of the frame left upper longitudinal member (112E) and further securely attached on a right distal end to the front distal end of the frame right upper longitudinal member (112F), the third set of plurality of web basket right diagonals (113A) are securely attached at a bottom distal end to a web basket front lower cross brace (113CB) which is securely attached at a left distal end to the front distal end of the frame left bottom longitudinal member (112A) and further securely attached at a right distal end to the front distal end of the frame right bottom longitudinal member (112B), a fourth set of plurality of web basket right diagonals (113A) are securely attached at a top distal end to a web basket rear upper cross brace (113DA) which is securely attached on a left distal end to the rear distal end of the frame left upper longitudinal member (112E) and further securely attached on a right distal end to the rear distal end of the frame right upper longitudinal member (112F), the fourth set of plurality of web basket right diagonals (113A) are securely attached at a bottom distal end to a web basket rear lower cross brace (113DB) which is securely attached at a left distal end to the rear distal end of the frame left bottom longitudinal member (112A) and further securely attached at a right distal end to the rear distal end of the frame right bottom longitudinal member (112B), the web basket (113) further comprises a first set of plurality of web basket left diagonals (113B) which are securely attached at a top distal end to the frame left upper longitudinal member (112E) and securely attached at a bottom distal end to the frame left bottom longitudinal member (112A), a second set of plurality of web basket left diagonals (113B) are securely attached at a top distal end to the frame right upper longitudinal member (112F) and securely attached at a bottom distal end to the frame right bottom longitudinal member (112B), a third set of plurality of web basket left diagonals (113B) are securely attached at a top distal end to the web basket front upper cross brace (113CA), the third set of plurality of web basket left diagonals (113B) are securely attached at a bottom distal end to the web basket front lower cross brace (113CB), a fourth set of plurality of web basket left diagonals (113B) are securely attached at a top distal end to a web basket rear upper cross brace (113DA), the fourth set of plurality of web basket left diagonals (113B) are securely attached at a bottom distal end to a web basket rear lower cross brace (113DB);

F) a handle (114) which comprises a handle left riser bar (114A) securely attached at a bottom distal end to the rear distal end of the frame left upper longitudinal member (112E) by a handle left riser bar lower fastener, the handle left riser bar (114A) is pivotally connected at a top distal end to left distal end of a handle push bar (114C) by a handle push bar right riser bar universal joint (114CB), the handle (114) further comprises a handle right riser bar (114B) securely attached at a bottom distal end to the rear distal end of the frame right upper longitudinal member (112F) by a handle left riser bar lower fastener, the handle right riser bar (114B) is removably attached at a top distal end to a right distal end of the handle push bar (114C) by a handle push bar left riser bar joint (114CA); and G) at least two main wheels (116) which comprise a main wheel left tire (116AA) mounted on a main wheel left hub (116AAB) which is securely connected to an outer distal end of a main wheel left axil (116AAA) which is rotatably connected at an inner distal end to a main wheel left axil retainer (116AAD) securely mounted on the frame left bottom longitudinal member (112A) by at least one main wheel left axil retainer fastener (116AAC), a main wheel right tire mounted on a main wheel right hub which is securely connected to an outer distal end of a main wheel right axil which is rotatably connected at an inner distal end to a main wheel right axil retainer securely mounted on the frame right bottom longitudinal member (112B) by at least one main wheel right axil retainer fastener.

2. The collapsible shopping cart (110) as described in claim 1 further comprises at least one tub (120) removably mountable therein.

3. The collapsible shopping cart (110) as described in claim 1 is manufactured from a material selected from a group consisting of plastic, plastic composite, epoxy, fiberglass, carbon-graphite, wood, composite, metal, and metal alloy.

* * * * *